United States Patent Office 3,539,885
Patented Nov. 10, 1970

1

3,539,885
EXTENDED FOIL CAPACITOR
Walter F. England, Williamstown, Mass., assignor to Sprague Electric Company, North Adams, Mass., a corporation of Massachusetts
Filed Aug. 20, 1968, Ser. No. 753,981
Int. Cl. H01g 1/01, 1/14
U.S. Cl. 317—258                            6 Claims

ABSTRACT OF THE DISCLOSURE

An extended foil capacitance section is terminated on each end by a headed lead which extends through a supporting end cap. The head of each lead is welded to the extended foil of the section, and the end caps are closely fitted to the section and bonded to the lead-head.

BACKGROUND OF THE INVENTION

This invention relates to an extended foil capacitor and more particularly to a miniature plastic film capacitor having terminals welded to the extended foil and extended through end caps of the section.

Miniature plastic film capacitors of the prior art, such as described in U.S. Pat. 3,150,300 issued to Alvin L. Schils et al., provide units of uniform size having well aligned lead wires. However, in this construction, in which end caps having extended leads are soldered to the extended foils, the terminal lead is not directly connected to the foils. The blind connection between the caps and foils also makes this bond very dependent upon close process control. Additionally, this prior art arrangement is not particularly suited to aluminum foil sections or the like which resist soldering.

One object of this invention is to provide an extended foil capacitor having improved terminal connection to the capacitor electrodes.

Another object of this invention is to provide a capacitor having terminal leads directly connected to the extended foil of the section and extended through and supported by end caps of the unit.

A further object of this invention is to provide a film capacitor having headed terminal leads welded to respective ends of the capacitance section.

These and other objects of the invention will be more apparent upon consideration of the following description and claims taken together with the accompanying drawing.

SUMMARY OF THE INVENTION

Broadly an extended foil capacitor constructed in accordance with the invention comprises a convolutely wound capacitance section having a pair of conductive electrodes separated by a ribbon of dielectric material, a cup-shaped end cap and a terminal lead disposed at each end of said section, each of said leads having a shaft portion terminating in an enlarged head, each head welded to the extended foil at a respective end of said section with said shafts extending through said end caps, and said end caps bonded to the heads for supporting said leads.

DESCRIPTION OF THE PREFERRED EMBODIMENT

Figure 1:
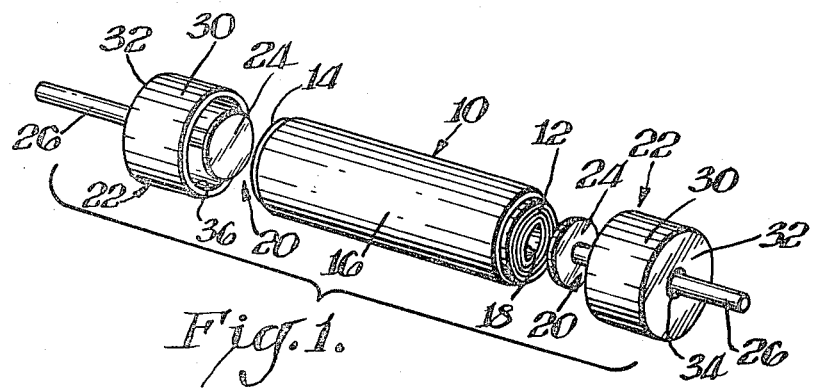
FIG. 1 is an exploded view in perspective of a capacitance section and terminals provided in accordance with the invention.
Figure 2:
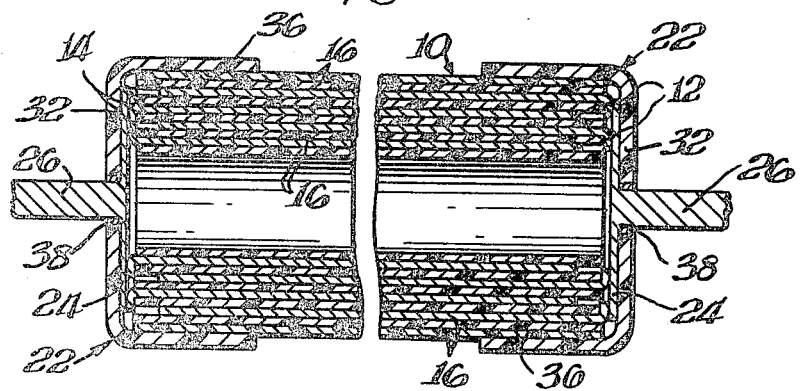
FIG. 2 is a view in section of a partially assembled capacitor provided in accordance with the invention.

FIGS. 1 and 2 show a convolutely wound capacitance section 10 having electrodes 12 and 14 wound in extended foil fashion with an interposed plastic film of dielectric material 16 which also provides an outer insulative cover on the section. Capacitance 10 is of the extended foil type in which a pair of electrodes are convolutely wound in capacitance relationship with the edge of one electrode extending beyond the other electrode at one end of the section, and a second of the pair of electrodes extending in like manner from the opposite end of the section.

This invention finds particular use for wound capacitance sections utilizing foils of materials which resist soldering. It also finds use for miniature sections which for ease in handling, particularly for ease in rolling on automatic equipment, take the form of a tube having a large internal bore 18 relative to the thin electrically active wall.

Electrodes 12 and 14 may be any of the conventional electrode material used in electrostatic capacitors such as metallic films deposited on a dielectric base or discrete metal foils. Preferably, electrodes 12 and 14 should be discrete foils of weldable material such as aluminum or the like.

Similarly, dielectric material 16 may comprise any of the conventional dielectric spacers, however plastic films are preferred in this instance since they are not sensitive to moisture pickup and may be employed to provide a bonding relationship between the outer layer of film and the end caps. In this regard, polyester, vinyl polymer and polycarbonate films, and more particularly polyethylene terephthalate and polystyrene films have been found to be suitable.

In the novel structure, a terminal lead 20 and end cap 22 are provided at each end of section 10. Lead 20 includes an enlarged head portion 24 substantially normal to a shaft portion 26, and is designed for connection of head 24 to the end of section 10 with shaft 26 extended coaxial thereto. Cap 22 is cup shaped, having a tubular side wall 30 that is substantially normal to a flat bottom wall 32. An aperture 34 of bottom 32 allows shaft 26 to extend through the cap.

In the preferred embodiment, head 24 is a flat portion, substantially larger in diameter than shaft 26 so as to provide a suitably flat area in contact with the wound end of the foils. In this regard, head 24 should generally have a diameter approximately equal to the diameter of the wound foils.

Of course, head 24 may take many different shapes. For example, it may be a cylindrical disc as illustrated in the drawing or have a rectangular, triangular or star shaped perimeter or the like. Head 24 may be formed in such configurations by upsetting techniques or the like, or by wire forming in which the lead is bent or coiled in vairous patterns normal to the lead axis. Terminal leads formed by the latter are, of course, more applicable to large heavy wall sections since the wire forming tends to provide somewhat less of a flat area for welding to the foils.

Lead 20 may be made of any suitable electrically conductive material, however, for the purposes of facilitating the welding techniques which form a preferred embodiment of carrying out this invention, it has been found desirable to make lead 20, or at least head 24, of weldable material such as copper or the like. On the other hand cap 22, which primarily provides mechanical support for the lead, may be of any suitably rigid material and is preferably of metal such as brass or the like. In the preferred embodiment, lead 20 and cap 22 are coated with fusible conductive material, for example, with an outer coating of tin or the like, so as to enhance bonding of the cap to the lead.

Figure 3:
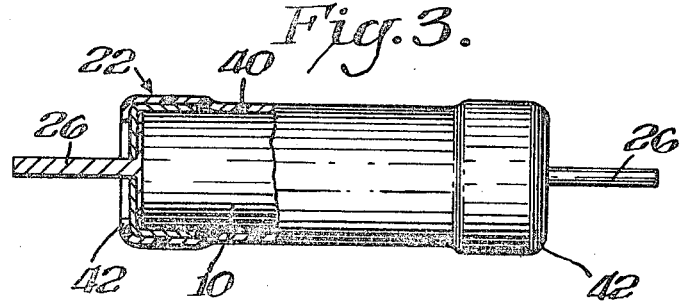
FIG. 3 is an elevational view partly in section of the completed capacitor.

As shown in FIGS. 2 and 3, head 24 of each lead is butted against the extending edges of the foils 12 and 14 at the respective ends of section 10 with shafts 26 extended coaxially from the unit. The heads are then welded to the foils by percussion welding or the like. Cap 22 is then disposed over the respective ends of section 10 with bottom 32 brought into contact with the outer surface of head 24 and with shaft 26 extended through aperture 34. Cap 22 is supported against canting by its internal bore 36 which is a relatively snug fit with a substantial length of section 10. The cap, in turn, provides axial alignment of the lead-shaft.

Cap 22 is fixedly secured to lead 20 and section 10 by any of the conventional bonding techniques known to the capacitor art. In the preferred embodiment, the caps are heated by resistance soldering methods or the like to join tin coated cap 22 to the tinned lead 20. The tin or other fusible conductive coating of the members bonds cap 22 to head 24 and flows within aperture 34, as at 38, to also bond the cap to shaft 26. This provides a rigid terminal assembly of cap and lead which assures axial alignment of the lead and increases its resistance to radial and axial stress.

The heat and pressure applied to cap 22 and section 10 in the bonding operation also causes the outer layers of plastic film to soften and flow into intimate contact with side 30 to further secure caps 22 and leads 20 to the section. This bond between the plastic and the wall of the cap further improves lead alignment and greatly enhances the ability of the capacitor of this invention to withstand pull-tests and the like designed to establish the durability of the capacitor terminations.

Advantageously, connection of leads 20 directly to foils 12 and 14 provides a more reliable connection of low resistance, and permits the use of welding techniques which are desirable for foil materials that resist soldering. Additionally, this construction provides a direct visible connection to the foils which is open to inspection until the caps are mounted.

The unit is completed, as shown in FIG. 3, by coating its outer diameter with insulative material of plastic or the like. This may be accomplished by dipping or spray coating or the like, however in the preferred embodiment, a heat shrinkable film 40 such as irradiated polyethylene or the like is utilized. Film 40, which is originally slightly longer and of larger diameter than the section, is slid over and positioned around the section, and is then heated to cause it to shrink tightly against the section diameter and to curl over the outer ends of the end cap, as shown at 42. This further increases the pull strength of the terminals.

The following specific example is recited of a preferred embodiment of the construction and procedures for producing a film capacitor according to this invention, however, it should be understood that this example is for purposes of illustration only and should not be construed to be limitive beyond the scope of the appended claims.

Two strips of polyethylene terephthalate 5/16 inch wide and .0005 inch thick were rolled as spacers between two thin aluminum foils 1/4 inch wide and .0004 inch thick on a .060 inch mandrel in an extended foil fashion with foil extensions of 1/16 inch on each end of the roll. A plastic film margin of 1/8 inch was provided beyond the non-extended or internal edge of each foil to leave an effective foil width or capacitive overlap of 1/16 inch. This construction was rolled to an outside diameter of .090 inch which resulted in an air core section having an inner diameter of .060 inch and a wall thickness of .015 inch. This construction produced a capacitance of 300 pf.

The tubular capacitance section was cured for several hours to provide a rigid self-sustaining capacitance unit. Suitable curing is provided by heating the section for two hours at a temperature of at least 105° C. and two hours at a temperature of at least 125° C. Tinned copper terminal leads having a shaft diameter of .025 inch and length of 1.5 inches with a head diameter of .076 inch and thickness of .020 inch were bonded to each end of the section. The heads were butted against the foil and welded thereto by percussion welding.

Tinned brass end caps having an OD of .120 inch, an ID of .092 inch, a length of .060 inch and a .040 inch diameter aperture in each end wall were fitted over the terminal leads and the ends of the cured section; and secured thereto by resistance heating which affected a bond between the leads and caps. The units were then positioned within a heat-shrinkable sleeve of irradiated polyolefin and heated at 135° C. to shrink the tubing around the longitudinal axis of the capacitor and to produce a plastic insulative coating of .020 inch thickness.

Many different embodiments are possible, of course. For example, the conductive fusible material may be provided on the cap or lead; or may be externally flowed through the aperture to bond the cap to the lead. Additiontal apertures may also be provided in the end wall overlying head 24 for external application of the fusible material. Many different head configurations are useful, and many different types of materials may be employed for both the leads, the end caps and the electrodes.

The novel construction may be utilized with many types of extended foil capacitors such as for example paper or rolled mica capacitors or the like. It should be understood, however, that with capacitive section having no outer plastic layer, the cap alignment will depend solely on its close fit to the section.

Caps having similar rigidity, but of nonmetallic material, such as plastic or the like may also be employed in practice of the invention. For example, caps of polypropylene or the like may be suitable. In this embodiment, a plastic film section would be employed such that plastic cap may be heated and flowed into bonding relationship with the leads and the film of the section.

Bonding to the lead-head can also be enhanced in any embodiment by providing apertures or the like therein. In addition, heads formed by wire bending etc. could also provide additional interlocking to the cap.

Hence, as many apparently widely different embodiments of this invention may be made without departing from the spirit and scope thereof, it is to be understood that the invention is not to be limited except as defined in the appended claims.

What is claimed is:

1. A capacitor comprising a convolutely wound extended-foil capacitance section having a pair of conductive electrodes separated by ribbons of plastic dielectric material, one of said dielectric ribbons being continued beyond the end of sail electrodes to form the outer layer of said section, a terminal lead and a cup-shaped end cap of conductive material disposed at each end of said section, each of said leads having a shaft disposed substantially normal to an enlarged substantially flat head, each of said lead-heads welded to an extended foil at a respective end of said section such that said lead-shafts extend axially therefrom, each of said end caps having an aperture located in the bottom wall thereof, said end caps being closely fitted to said section and disposed over the ends thereof so as to enclose said lead-heads, said caps bonded in plastic-to-metal bond to said outer layer, said lead-shafts extending through the aperture of its respective cap, and the inner bottom wall of said caps bonded to the outer surface of said lead-heads for providing mechanical support and axial alignment of said leads.

2. The capacitor of claim 1 wherein each lead-shaft is substantially centrally located on its lead-head, and each of said apertures is centrally located in said bottom wall.

3. The capacitor of claim 1 wherein said foils are of solder resistant material.

4. The capacitor of claim 3 wherein said foil material is aluminum.

5. The capacitor of claim 1 including a plastic coating enclosing said section and at least the side walls of said end caps.

6. The capacitor of claim 1 wherein said caps are of metal, and said caps are soldered to the outer surface of said lead-heads.

References Cited

UNITED STATES PATENTS

| | | | |
|---|---|---|---|
| 2,455,136 | 11/1948 | Obert | 317—260 X |
| 3,267,343 | 8/1966 | Rayburn | 317—260 |
| 3,244,953 | 4/1966 | Walsh | 317—260 |

FOREIGN PATENTS

| | | |
|---|---|---|
| 142,864 | 8/1951 | Australia. |
| 1,022,537 | 3/1966 | Great Britain. |

ELLIOT A. GOLDBERG, Primary Examiner

U.S. Cl. X.R.

317—260